US010669775B2

(12) United States Patent
Cole et al.

(10) Patent No.: US 10,669,775 B2
(45) Date of Patent: Jun. 2, 2020

(54) INTEGRATED DIRECT DRIVE MOTOR SYSTEM

(71) Applicant: Therm-L-Tec Systems, LLC, Basehor, KS (US)

(72) Inventors: Steven C. Cole, Basehor, KS (US); Joshua S. Cole, Tonganoxie, KS (US); Peter E. Albrecht, Basehor, KS (US)

(73) Assignee: THERM-L-TEC SYSTEMS, LLC, Basehor, KS (US)

( * ) Notice: Subject to any disclaimer, the term of this patent is extended or adjusted under 35 U.S.C. 154(b) by 416 days.

(21) Appl. No.: 15/402,328

(22) Filed: Jan. 10, 2017

(65) Prior Publication Data
US 2017/0201140 A1 Jul. 13, 2017

Related U.S. Application Data

(60) Provisional application No. 62/277,163, filed on Jan. 11, 2016.

(51) Int. Cl.
E06B 9/72 (2006.01)
E06B 9/90 (2006.01)
(Continued)

(52) U.S. Cl.
CPC .............. E06B 9/72 (2013.01); E06B 9/13 (2013.01); E06B 9/171 (2013.01); E06B 9/70 (2013.01);
(Continued)

(58) Field of Classification Search
CPC ... E06B 9/90; E06B 9/88; E06B 9/171; E06B 9/13; E06B 9/70; E06B 9/72; E06B 9/174;
(Continued)

(56) References Cited

U.S. PATENT DOCUMENTS 3,056,054 A * 9/1962 Christian ............... B65G 23/08
310/57
4,651,940 A * 3/1987 Nakamura ............... E06B 9/72
160/310
(Continued)

FOREIGN PATENT DOCUMENTS

KR 100656387 12/2006
RU 2420645 9/2010

OTHER PUBLICATIONS

European Search Report; dated Feb. 13, 2019.

Primary Examiner — Katherine W Mitchell
Assistant Examiner — Abe Massad
(74) Attorney, Agent, or Firm — Hovey Williams LLP

(57) ABSTRACT

An integrated direct drive motor system for industrial use includes an outer rotor motor axially aligned with, and coupled to, a rotating drum, with no transmission or clutch mechanism between the two so that the drum is effectively an extension of the outer rotor of the motor. An adapter coupler attaches to the motor and the drum to allow the motor to directly drive the drum. In one exemplary embodiment, a flexible curtain is spooled vertically by the drum to control an industrial high-speed roll-up door. In another exemplary embodiment, an endless-loop belt is driven by a horizontally-oriented drum to control an industrial conveyor system. Various embodiments of the integrated direct drive motor system and various method of operation are disclosed.

17 Claims, 11 Drawing Sheets

(51) Int. Cl.
*E06B 9/88* (2006.01)
*E06B 9/13* (2006.01)
*E06B 9/171* (2006.01)
*E06B 9/70* (2006.01)
*H02K 16/00* (2006.01)
*H02K 7/10* (2006.01)
*E06B 9/80* (2006.01)
*E06B 9/174* (2006.01)
*B65G 23/08* (2006.01)
*B65G 39/12* (2006.01)
*H02K 1/27* (2006.01)
*H02K 7/14* (2006.01)

(52) U.S. Cl.
CPC .......... *E06B 9/88* (2013.01); *E06B 9/90* (2013.01); *B65G 23/08* (2013.01); *B65G 39/12* (2013.01); *B65G 2207/30* (2013.01); *E06B 9/174* (2013.01); *E06B 2009/807* (2013.01); *H02K 1/2786* (2013.01); *H02K 7/1008* (2013.01); *H02K 7/14* (2013.01); *H02K 16/00* (2013.01); *H02K 2207/03* (2013.01)

(58) Field of Classification Search
CPC .......... E06B 2009/807; B65G 23/08; B65G 2207/03; B65G 39/12
See application file for complete search history.

(56) References Cited

U.S. PATENT DOCUMENTS

| | | | |
|---|---|---|---|
| 5,442,248 A | 8/1995 | Agnoff | |
| 5,467,266 A * | 11/1995 | Jacobs | B60J 1/2016 160/1 |
| 6,082,433 A | 7/2000 | Vafaie et al. | |
| 6,244,427 B1 * | 6/2001 | Syverson | B65G 13/06 198/784 |
| 6,455,960 B1 | 9/2002 | Trago et al. | |
| 6,808,063 B2 * | 10/2004 | Itoh | B65G 13/06 193/37 |
| 7,299,915 B2 * | 11/2007 | El-Ibiary | B65G 23/08 198/780 |
| 7,956,501 B2 | 6/2011 | Jun et al. | |
| 8,364,307 B2 * | 1/2013 | Carlson | B65G 47/54 198/370.09 |
| 9,169,078 B2 | 10/2015 | Petack | |
| 9,399,556 B2 * | 7/2016 | Wolters | B65G 23/08 |
| 2006/0232147 A1 * | 10/2006 | Cheng | A63B 22/02 310/52 |
| 2006/0261698 A1 | 11/2006 | Lee | |
| 2014/0224437 A1 * | 8/2014 | Colson | E06B 9/42 160/291 |
| 2014/0332204 A1 | 11/2014 | Aubry | |
| 2016/0090771 A1 * | 3/2016 | Hsieh | E05F 15/665 49/349 |

\* cited by examiner

INTEGRATED DIRECT DRIVE MOTOR SYSTEM

CROSS-REFERENCE TO RELATED APPLICATIONS

This application claims priority to U.S. Provisional Application Ser. No. 62/277,163, filed on Jan. 11, 2016 which is hereby incorporated herein by reference in its entirety.

BACKGROUND

High-speed roll-up doors and driven belt conveyor systems are ubiquitous in industrial buildings, warehouses, and facilities throughout the world.

High-speed industrial roll-up doors employing an extendible and retractable curtain are used, for example, to cover doorways separating areas of a warehouse to contain conditioned air and to minimize air migration between the separated areas. In typical use, the curtain, comprising a heavy, durable, flexible material, such as a plastic, rubber, woven, or composite sheet material, is quickly retracted upwardly onto a rotating tube positioned above the doorway opening upon detection of an approaching vehicle (e.g., a forklift) or object to allow passage of the vehicle through the doorway, and is quickly extended downwardly from the tube (by rotating the tube in the opposite direction) to cover the doorway once the vehicle or object has passed. Thus, the doorway remains normally closed, covered by the curtain, and is opened for only short periods of time, to minimize migration of air between the areas separated by the curtain.

Drive systems for rotating the tube used to retract and extend the roll-up door's curtain typically employ a three-phase induction motor having an internal rotor shaft, with a transmission coupling the rotor shaft to the tube, the transmission comprising gears to regulate the speed of rotations and an electro-mechanical brake or clutch to regulate and/or decouple the tube.

Industrial conveyor systems similarly use a rotating tube or drum in frictional engagement with a continuous loop of heavy, durable, flexible material to convey items during the manufacture, packaging, or transport of items, for example, in in a warehouse. Typical conveyor systems drive systems are essentially identical to high-speed roll-up door drive systems—but oriented horizontally rather than vertically—using a rotating tube to convey the continuous loop of curtain-like material. Similar to known high speed door systems, known conveyor systems use a three-phase induction motor having an internal rotor shaft, with an attached transmission and an electro-mechanical brake or clutch coupling the internal rotor shaft to the tube.

While widely used, conventional three-phase motor drive systems, and motors having internal rotor shafts, suffer from numerous deficiencies. Induction motors are slow in both starting and stopping, such that startup torque is delayed past the initial application of power to the motor, stopping the motor likewise requires the assistance of a brake, such as an electro mechanical brake, or a clutch is used to decouple the motor shaft and/or transmission from the tube. Thus, near-instantaneous reversal of the motor direction is impossible, with the relatively long ramp-up and ramp-down times limiting the speed at which motor direction changes can be achieved.

Furthermore, the transmission and brake mechanisms required for use with the motors are themselves each comprised of a multitude of individual parts, such as gears, shafts, etc., all of which have wear surfaces and all of which require nearly continuous maintenance, such as maintaining lubrication and monitoring for wear, particularly in applications involving high-frequency cycling of one-hundred or more times per hour as is commonly incurred in operating industrial roll-up doors and conveyors.

Induction motors are also subject to overheating thus an additional cooling fan component is often added to the motor to direct cooling air through the motor during its operation. However, because the fan operates only via operation of the motor itself, cooling air is directed only while the motor is in operation. Once the motor stops, so does the flow of cooling air. Thus, in high-frequency operation, the flow of cooling air is intermittent and during the non-operational times the heat generated by the motor propagates to adjacent parts, raising the overall temperature of the entire system and driving up the internal temperature of the motor during each cycle of operation. The use of variable frequency induction motors further compounds the problem as the reduced shaft speed associated with those motors translates to a reduced volume of cooling air provided by the fan.

Thus, it can be seen that there is a need in the art for an improved drive system for use in high-frequency and intermittent industrial applications, such as high-speed roll-up doors and conveyor systems.

SUMMARY

Embodiments of the invention are defined by the claims below, not this summary. A high-level overview of various aspects of the invention is provided here to introduce a selection of concepts that are further described in the Detailed Description section below. This summary is not intended to identify key features or essential features of the claimed subject matter, nor is it intended to be used in isolation to determine the scope of the claimed subject matter. In brief, this disclosure describes an integrated direct drive motor system well-suited for use with industrial high-speed roll-up door and conveyor systems.

In one embodiment, the integrated direct drive motor system includes a three-phase, external rotor motor wherein the external rotor is attached in axial alignment directly to a tube or drum, with no transmission, brake, or clutch mechanisms between the external rotor and drum so that as the external rotor rotates, the attached drum correspondingly rotates. The drum thus effectively acts an extension of the external rotor.

In another embodiment, a solid adapter couples the external rotor to the drum, with not transmission, brake, or clutch mechanisms between the rotor and the drum. The drum thus rotates with the external rotor and effectively acts as an extension of the external rotor. Either the drum or the rotor can be independently detached from the adapter for repair or replacement.

In another embodiment, the motor is positioned at least partially within the tube or drum so that a portion of the exterior surface of the external rotor of the motor faces the interior surface of the drum, with the drum attached directly to the rotor, or attached via a coupler or adapter.

In further embodiments, the assembly includes two motors, positioned at opposite ends of the drum, with the drum attached at each end to the corresponding rotor.

In alternative embodiments the attached motor and drum assembly is mounted in to a wall, doorway, structure, or other support with the internal, stationary portion of the motor attached to the structure at one end of the assembly and the distal end of the drum portion supported by the structure at the opposite end of the assembly. With the motor and drum assembly thus attached to and/or supported by the structure, the external motor and attached drum are free to rotate in proximity to the structure.

In one embodiment, the motor and drum assembly is oriented horizontally, attached between or adjacent a doorway opening, with a curtain attached at one end to the drum so that rotation of the drum spools the curtain vertically onto the drum when the motor is rotated in a first direction to open the doorway and de-spools the curtain vertically from the drum when the motor is rotated in a second direction to close the doorway.

In another embodiment, the motor and drum assembly is oriented horizontally, attached to a conveyor support structure. A continuous loop conveyor belt is frictionally engaged between the drum and one or more idler rollers attached to the support structure so that operating the motor conveys the belt in a continuous motion to transport objects along the run of the conveyor.

DESCRIPTION OF THE DRAWINGS

Illustrative embodiments of the invention are described in detail below with reference to the attached drawing figures, and wherein.

DETAILED DESCRIPTION

Figure 1:
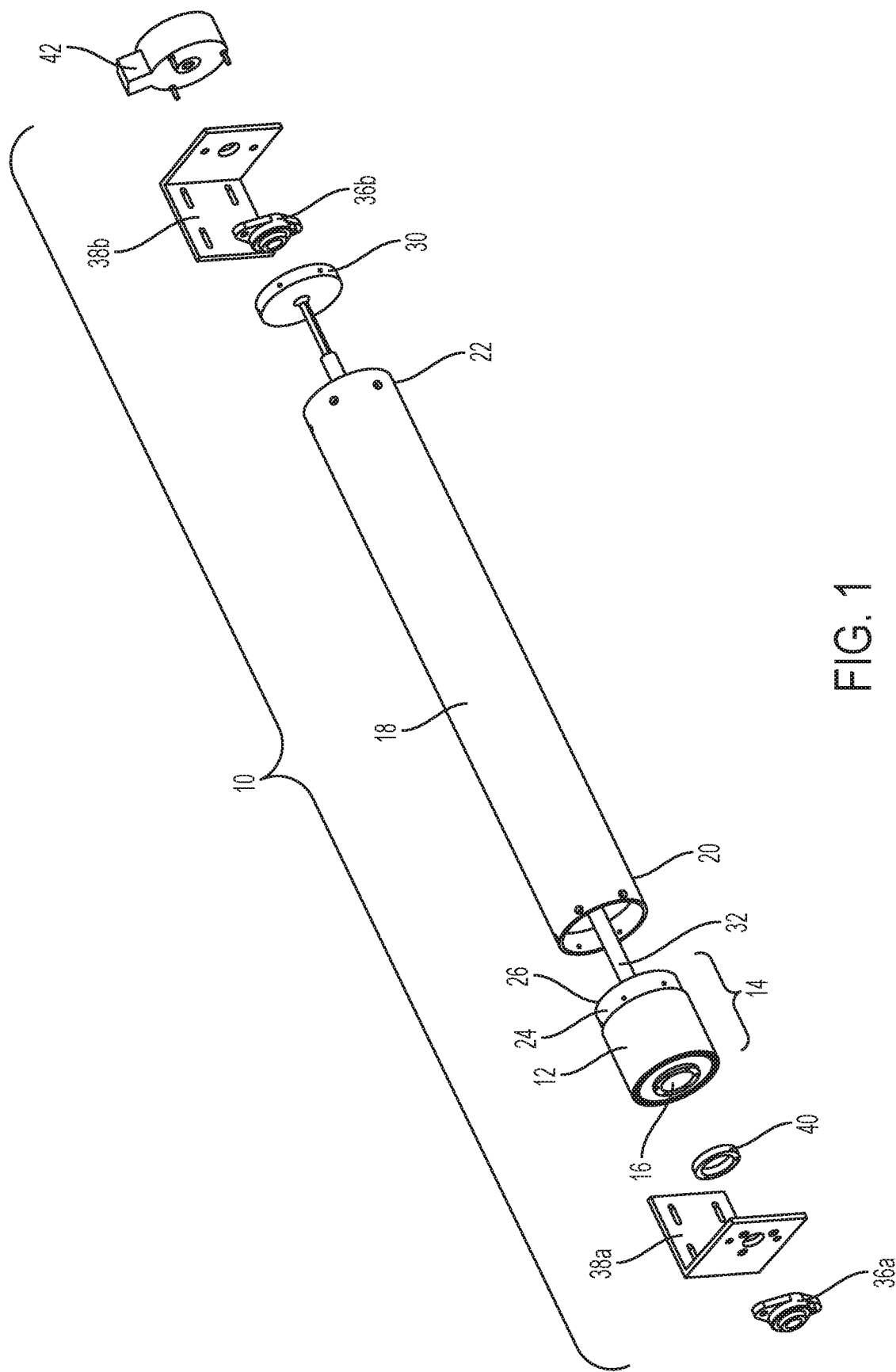
FIG. 1 is a partially-exploded front perspective view of an integrated direct drive motor assembly in accordance with a first exemplary embodiment of the present invention.

The subject matter of select embodiments of the invention is described with specificity herein to meet statutory requirements. But the description itself is not intended to necessarily limit the scope of claims. Rather, the claimed subject matter might be embodied in other ways to include different components, steps, or combinations thereof similar to the ones described in this document, in conjunction with other present or future technologies. Terms should not be interpreted as implying any particular order among or between various steps herein disclosed unless and except when the order of individual steps is explicitly described. The terms "about" or "approximately" as used herein denote deviations from the exact value in the form of changes or deviations that are insignificant to the function.

Looking first to FIGS. 1 through 4, an integrated direct drive motor assembly in accordance with a first exemplary embodiment of the present invention is depicted generally by the numeral 10. The assembly includes a permanent magnet outer rotor motor 12 having a rotatable, outer rotor 14, with a stationary internal stator portion 16. As is known in the art, an outer rotor motor operates by rotating the outer rotor about the stationary inner stator, as opposed to a conventional DC or induction motor in which a shaft extends along the center axis of the motor and rotates within a stationary outer stator. The outer rotor 14 thus rotates about the stationary 16 stator. Motor 12 may be any outer rotor motor known in the art, preferably it is a three phase, 100 Hertz, 230 VAC motor. Most preferably, the motor is rated at 30 Nm constant torque and 90 Nm peak torque. In alternative embodiments, other outer rotor motors having different specifications may be used.

Looking still to FIGS. 1 through 4, an elongated open-ended, hollow cylindrical drum 18, extends between first 20 and second 22 ends and is positioned adjacent to, and axially aligned with, motor 12. Drum 18 is preferably made from a strong, rigid material such as aluminum, steel, or composite material. Most preferably the drum is made of steel of sufficient strength to support a door-length curtain spooled or wound onto the drum.

Figure 2:
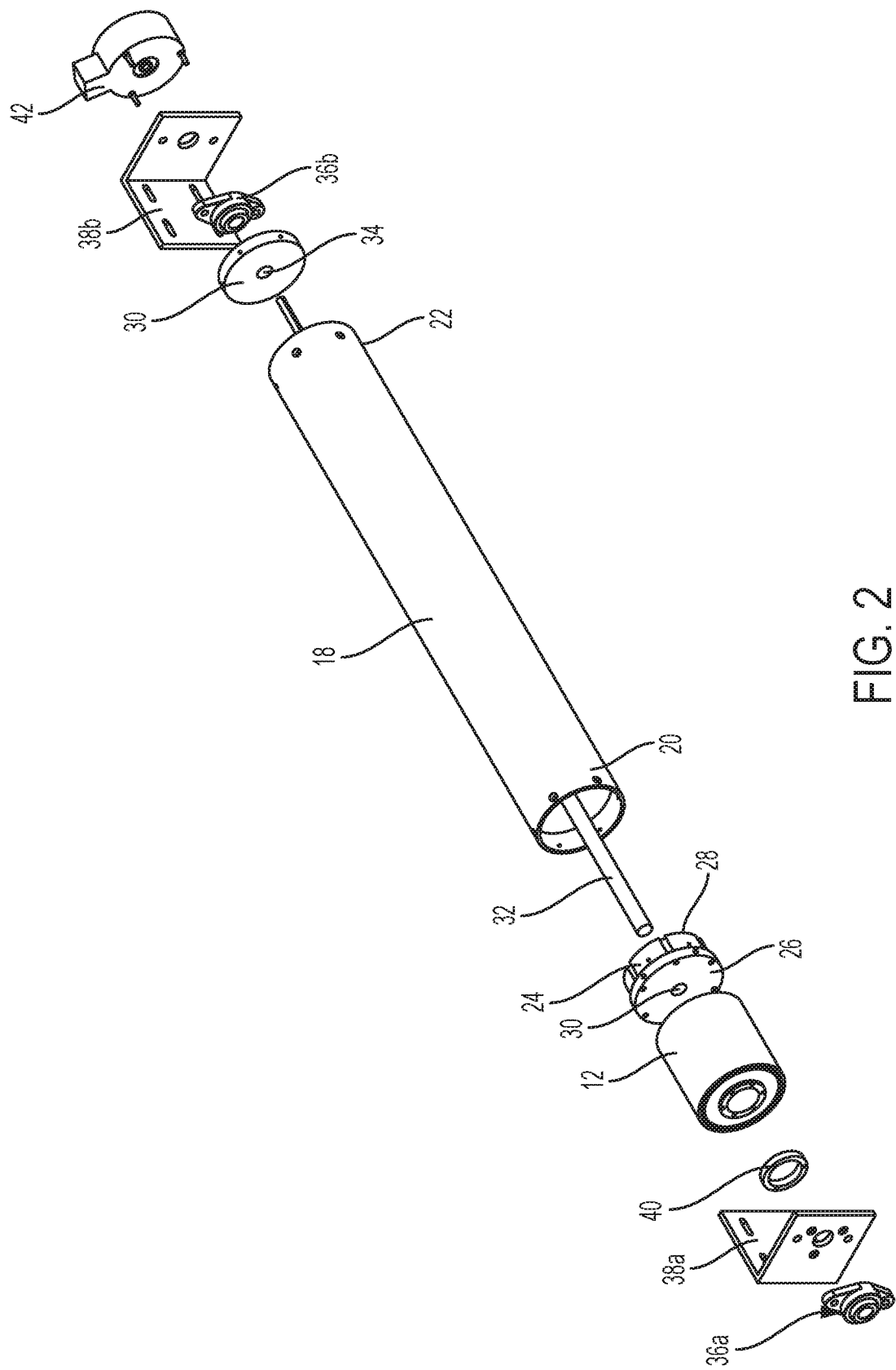
FIG. 2 is a further-exploded, front perspective view of the integrated direct drive motor assembly of FIG. 1.

A solid, cylindrical adapter coupler 24, having no movable parts, is attached to the inner-facing end of the motor's 12 outer rotor 14 using screws, bolts, or other fastening means known in the art so that the adapter coupler 24 rotates with the outer rotor 14 of the motor 12. The first end 26 of the adapter coupler 24 is preferably sized so that its diameter is approximately equal to the end diameter of the outer rotor 14 to which it is attached, although in alternative embodiments the adapter coupler may be larger or smaller in diameter than the diameter of the outer rotor. The protruding second end 28 of the adapter coupler 24 is preferably sized so that its diameter is approximately equal to, or slightly less than, the interior diameter of the drum 18 so that the second end of the adapter coupler 24 can be inserted or press-fit into the open first end 20 of the drum. As best seen in FIG. 2, a passageway 30 formed through the center axis of the adapter coupler 24 allows a shaft 32 (as will be discussed in more detail below) to pass through the adapter coupler 24. In alternative embodiments, the outer rotor 14 of motor 12 can be directly attached to the drum 18, without the use of an adapter coupler. For example, the outer rotor 14 of motor 12 may be inserted partially into the drum 18, with the drum 18 attached directly to the inserted outer rotor 14. Or, the outer rotor 14 may be formed or machined to provide a recessed portion configured to receive the drum 18 for attachment, eliminating the need for an adapter coupler 24.

It should be understood that the outer rotor 14 of the motor 12 is coupled to the drum 18 either directly (i.e., the drum is attached directly to the outer rotor) or via a solid adapter coupling (i.e., a coupling having no moving or movable parts, and no disengagement mechanism) so that rotation of the outer rotor 14 is identically imparted to the drum—i.e., the drum 18 rotates in unison with the outer rotor 14, in axial alignment and in the same direction, at the same angular rotation, and at the same angular velocity. There is no transmission, gearing, clutch, or other power translation or engagement/disengagement means or mechanism, or any slippage between the motor and the drum. Thus, essentially all rotational force provided by the motor is imparted to the drum, which is configured as an extension of the outer rotor, with no force losses through the coupling between the two.

A cylindrical end flange 30, positioned at the opposite end of drum 18 from the motor 12, is sized so that its diameter is approximately equal to, or slightly less than, the interior diameter of the drum 18 so that the end flange 30 can be inserted or press-fit into the open second end 22 of the drum, in a manner similar to the fitment of the adapter coupler 24 into the first end of the drum. A passageway 34 formed in the center axis of the end flange 30 allows shaft 32 to pass through the flange.

A series of apertures spaced circumferentially around each end 20, 22 of the drum 18 allow the corresponding end of the drum to be attached to the adapter coupler 24 and the end flange 30 using fasteners such as screws or bolts.

Shaft 32 is an elongated, cylindrical rod extending coaxially along the interior axis of the drum 18, and through the passageways 30, 34 in the adapter coupler 24 and end flange 30, respectively, as just described. In this embodiment, the shaft 32 is preferably keyed to connect to the adapter coupler 24 and/or to the end flange 30 such that the shaft 32 rotates along with the outer rotor 14 and the drum 18. Most preferably, the shaft 32 is connected to the adapter coupler 24 and/or end flange 30 using a set key, set screws, woodruff key, or other attachment means known in the art. Two flange bearings 36a, 36b, positioned at opposite ends of the assembly, support the corresponding opposite ends of the shaft 32. Flange bearings 36a, 36b preferably provide a ball bearing or other encompassing bearing surface for the corresponding supported circular end of the shaft 32, and preferably include a set screw or attachment means to secure the end of the shaft within the bearing.

Each flange bearing 36a, 36b is attached to a corresponding "L" shaped bracket 38a, 38b, with one "L" bracket positioned at each end of the assembly. The "L" brackets 38a, 38b include mounting holes in one arm of the "L" for attaching the corresponding flange bearing 36a, 36b using fasteners such as bolts or screws, and holes aligned with the axis of the motor 12 and drum 18 to allow the shaft 32 to pass through, with slotted openings in the other arm of the "L" for mounting the bracket to a structure.

An aluminum spacer disk 40 is positioned between the motor 12 and the "L" bracket at the motor end of the assembly. The spacer disk positions the motor 12 away from the "L" bracket, providing clearance between the bracket and the rotating outer rotor 14, and further serving to frictionally engage both the "L" bracket and the stationary stator 16 portion of the motor.

The distal end of shaft 32, i.e., the end of the shaft at the opposite end of the assembly from the motor 12, extends through the corresponding flange bearing 36b and its supporting "L" bracket 38b, with an electromagnetic off brake 42 attached to that distal end. The electromagnetic off brake is operable to prevent rotation of the shaft by application of a control current corresponding to the desired applied torque. Thus, for example, when used in a high-speed roll-up door application, the electromagnetic off brake 42 can be activated by the control circuitry to hold the door in its open position (e.g., a flexible curtain covering a doorway opening is spooled upwardly onto the drum, opening the doorway), preventing the weight of the curtain from de-spooling itself from the drum. It should be understood that in some embodiments the integrated direct drive motor system can operate without an electromagnetic off brake, and that in those embodiments or applications, such as the two-motor embodiment described herein, no brake need be used.

Looking to FIG. 3, with the elements of the integrated direct drive motor system assembled, the operation of the system will now be described. As previously described, motor 12 is a three-phase outer rotor motor, with an outer rotor 14 that rotates upon application of power to the motor. As is known, the direction and speed of rotation of the motor is controlled and varied by the sequence of the voltage applied to the three phases (e.g., L1, L2, and L3) of the motor, typically as sinusoidal or pulse width modulated (PWM) signals. Control circuitry operable to operate the motor at a desired speed and direction of rotation, and for monitoring motor and system operational parameters, as well as other system input sensors, such as door curtain position sensors or encoders. Preferably, the motor 12 includes an internal encoder operable to provide a signal corresponding to the position of the door curtain.

Figure 3:
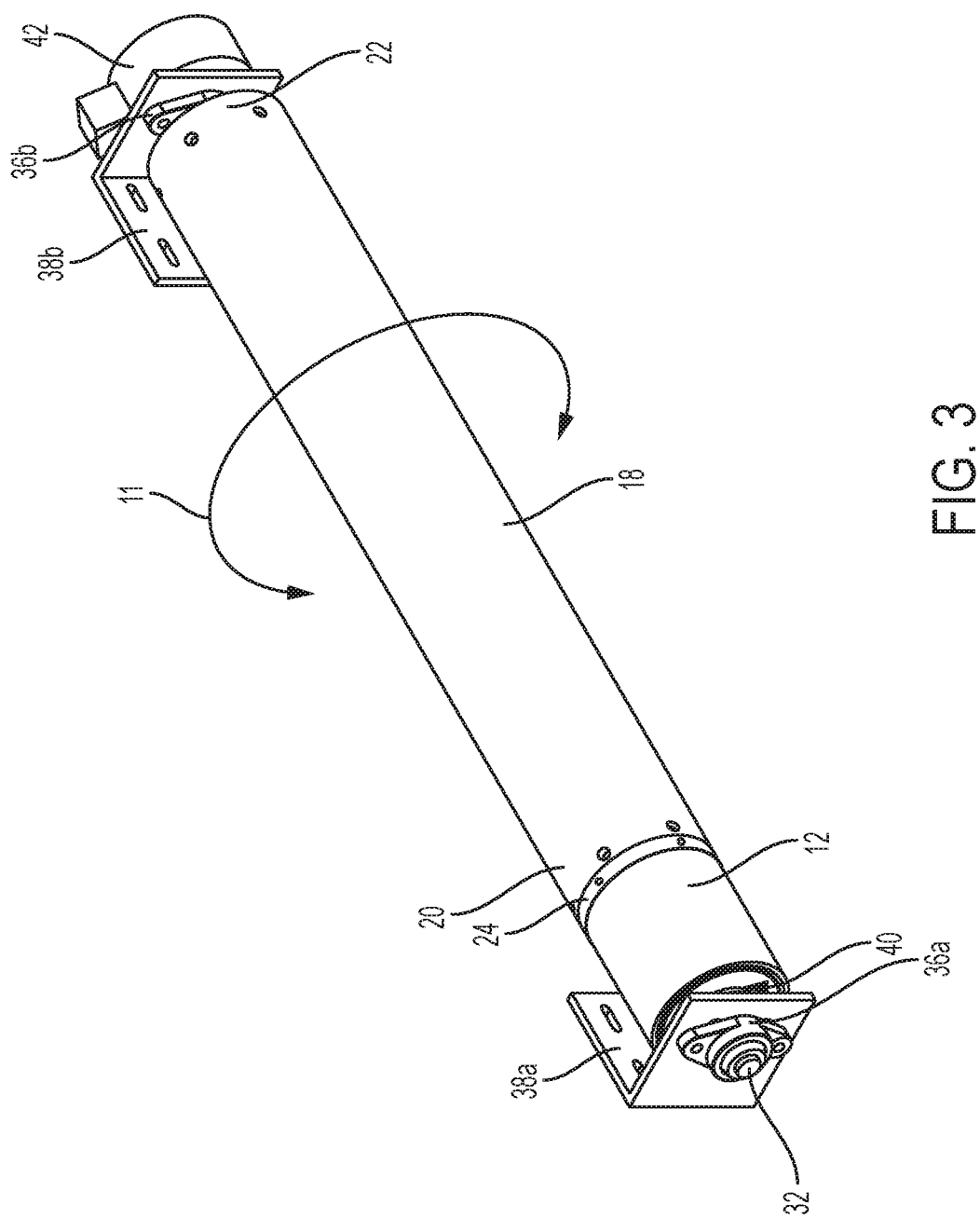
FIG. 3 is an assembled, front perspective view of the integrated direct drive motor assembly of FIG. 1.
Figure 4:
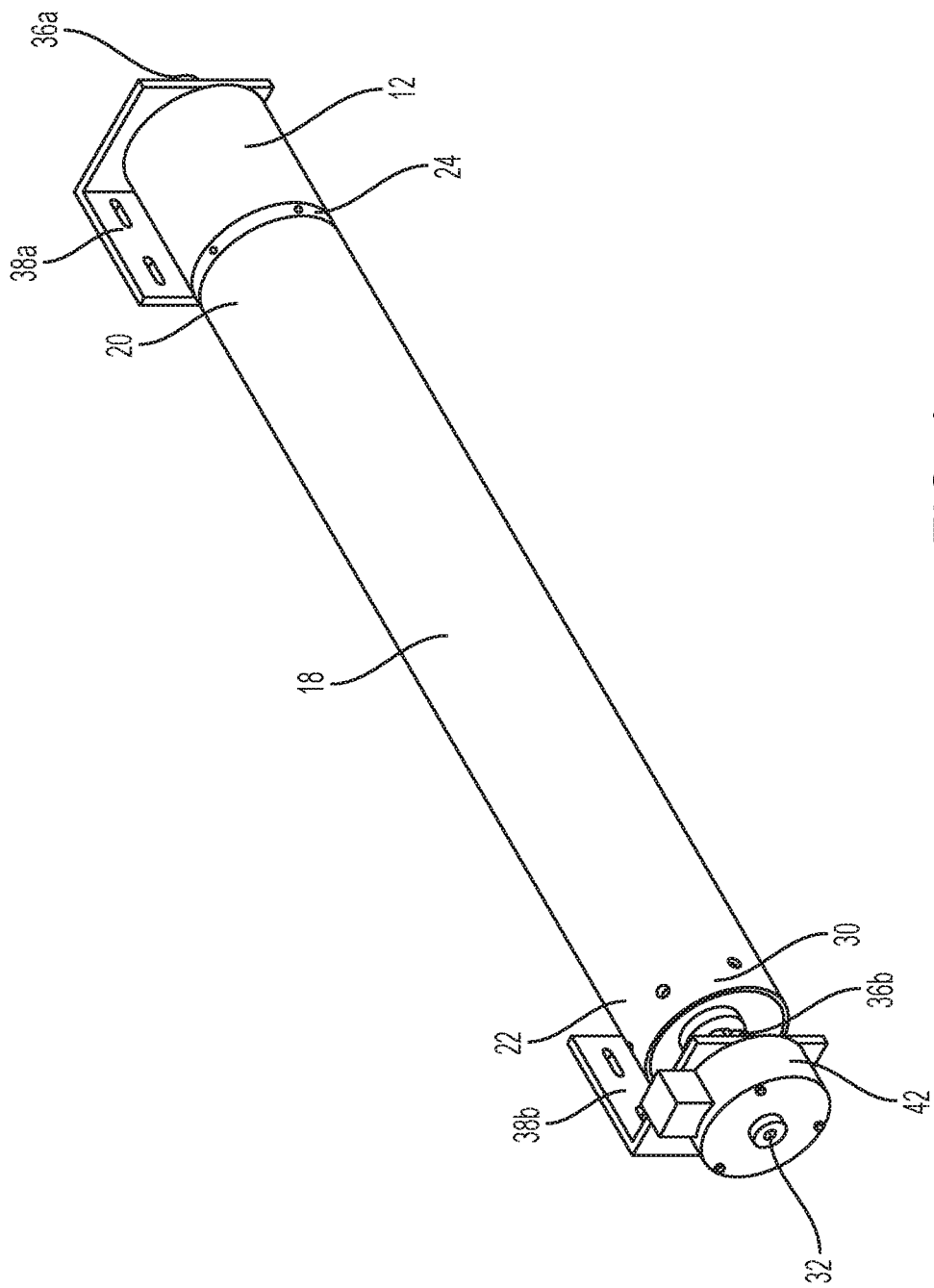
FIG. 4 is a front perspective view of an integrated drive motor assembly of in accordance with a second exemplary embodiment of the present invention.

As seen in FIGS. 3 and 4, with the system assembled, the outer rotor 14 of motor 12 is attached to the first end of the adapter coupler 24 as previously described, with the second end of the adapter coupler inserted into, and attached to, the first end of drum 18. End flange 30 is inserted into, and attached to, the second end of drum 18. Shaft 32 extends the length of the assembly, along the axis of the drum and the motor, extending through the axis openings in the adapter coupler 24 and end flange 30 as previously described, and along the axis of drum 18. At the first end of the assembly, shaft 32 extends through the stationary center axis of the motor, and into the flange bearing 36a, supported by "L" bracket 38a. At the second end of the assembly, shaft 32 extends through the flange bearing 36b, supported by "L" bracket 38b, and into the electromagnetic off brake 42.

With the system thus assembled, and the two "L" brackets 38a, 38b attached to a structure (e.g., a doorway frame, or a conveyor support frame), rotation of the outer rotor 14 motor 12 in either direction directly rotates (as indicated by numeral 11 in the drawings) the drum 18 in that same direction. The outer rotor motor's drive torque and power is transferred directly to the drum 18, which may be used to spool a curtain for a high-speed roll-up door, to drive a belt for a conveyor system, or used in other systems in which a high-torque rotating drum is required. For example, the rotating drum of the integrated direct drive motor system of the present invention could be used as a power screed used for finishing concrete. The weight of the motor and drum assembly is borne and supported by the shaft 32, which transfers the weight load through the flange bearings 36a, 36b, to the "L" brackets 38a, 38b, and to the structure to which the "L" brackets are attached. As discussed above, shaft 32 is not the drive shaft of the motor, it rotates only through its connection to the motor through the adapter coupler 24 as described above. In alternative embodiments discussed below, the shaft 32 is not coupled to the motor 12 or drum 18, and can be used for other purposes while still serving to support the weight of the assembly. In the embodiment shown in FIGS. 1 through 4, because shaft 32 is coupled to the motor 12 via the adapter coupler 24 and/or the end flange 30, the electromagnetic off brake 42 is used to stop rotation of the shaft 32 and thus stop rotation of motor 12 and drum 18 upon command from the control circuitry. In alternative embodiments, shaft 32 is not coupled to an electromagnetic off brake, and serves only to support the assembly, or can be used for ancillary purposes.

Figure 5:
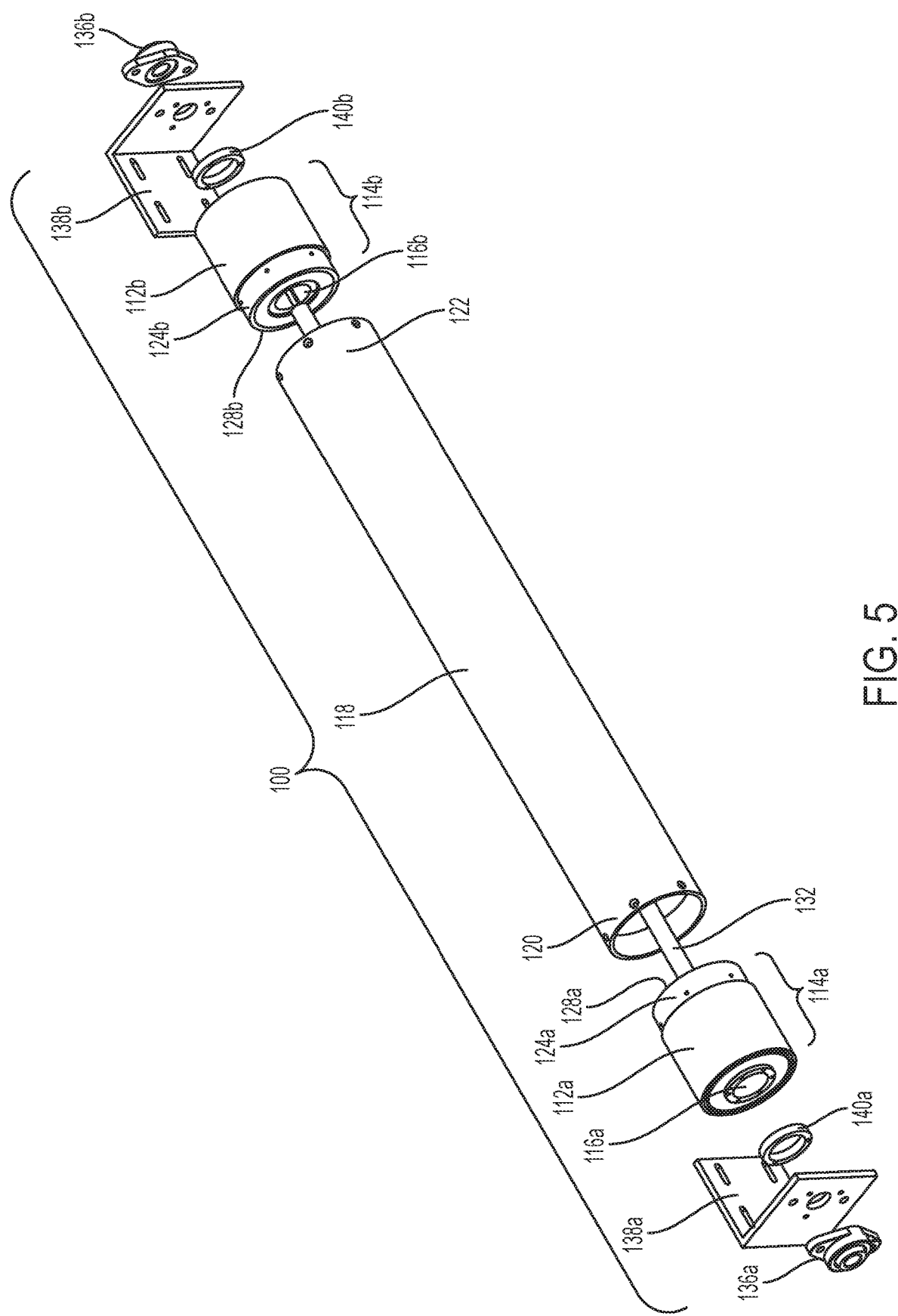
FIG. 5 is an exploded, front perspective view of an integrated drive motor assembly in accordance with a third exemplary embodiment of the present invention.
Figure 6:
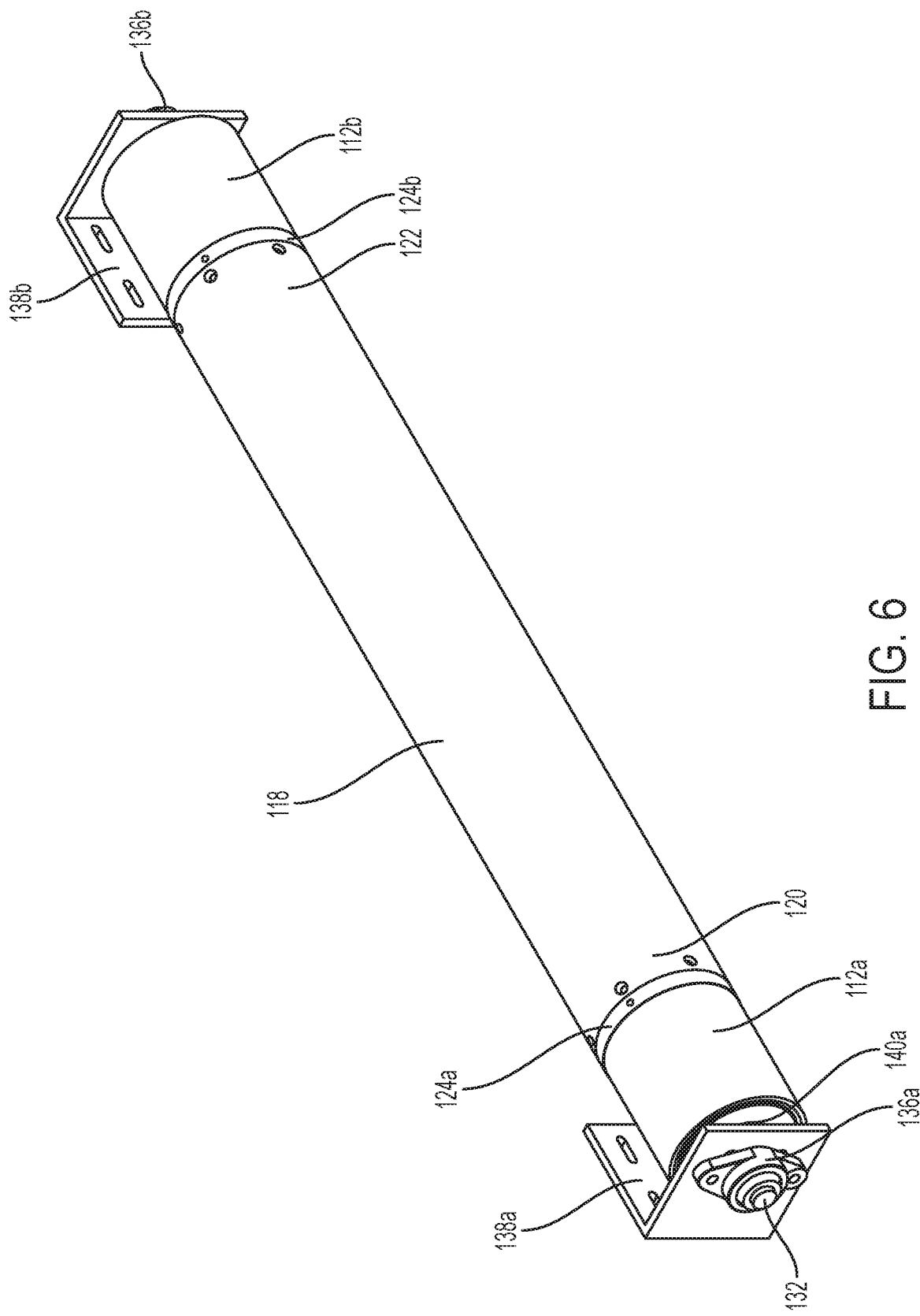
FIG. 6 is an assembled, front perspective view of the integrated drive motor assembly of FIG. 5.

Looking to FIGS. 5 and 6, an integrated direct drive motor assembly in accordance with a second exemplary embodiment of the present invention is depicted generally by the numeral 100. The assembly includes two three-phase outer rotor motors 112*a*, 112*b*, each having a rotatable, outer rotor 114*a*, 114*b* and a stationary internal stator portion 116*a*, 116*b*.

An open-ended, hollow cylindrical drum 118, extends between first 120 and second 122 ends and is positioned adjacent to, and axially aligned with, motors 112*a*, 112*b*.

Two cylindrical adapter couplers 124*a*, 124*b* attach at one end to the end of the corresponding motor's 112*a*, 112*b* outer rotor 114*a*, 114*b* using screws, bolts, or other fastening means known in the art so that each adapter coupler 124*a*, 124*b* rotates with the associated motor 112*a*, 112*b* and outer rotor 114*a*, 114*b*. The protruding unattached end 128*a*, 128*b* of each adapter coupler 124*a*, 124*b* is sized so that its diameter is approximately equal to, or slightly less than, the interior diameter of the drum 118 so that those ends 128*a*, 128*b* are inserted or press-fit into the corresponding open ends of the drum 118.

A passageway formed in the center axis of each adapter coupler 124*a*, 124*b* allows a shaft 132 (as will be discussed in more detail below) to pass through the adapter coupler. In alternative embodiments, the outer rotors 114*a*, 114*b* of motors 112*a*, 112*b* can be directly attached to the drum 118, without the use of an adapter coupler.

A series of apertures spaced circumferentially around each end 120, 122 of the drum 118 allow the ends of the drum to be attached to the corresponding adapter coupler 124*a*, 124*b* using fasteners such as screws or bolts.

Shaft 132 is an elongated, cylindrical rod extending coaxially along the interior axis of the drum 118, and through the axial passageways in the adapter couplers 124*a*, 124*b*. Preferably, the shaft 132 is keyed to connect to one or both of the adapter couplers so that the shaft 132 rotates with the outer rotors 114*a*, 114*b* and the drum 118. Most preferably, the shaft 132 is connected to the adapter coupler 124*a*, 124*b* using a set key, set screws, woodruff key, or other attachment means known in the art.

Two flange bearings 136*a*, 136*b*, positioned at opposite ends of the assembly, support the corresponding opposite ends of the shaft 132. Flange bearings 136*a*, 136*b* preferably provide a circular bearing surface encompassing the corresponding supported end of the shaft 132, and preferably include a set screw or attachment means to secure the end of the shaft within the bearing.

Each flange bearing 136*a*, 136*b* is attached to a corresponding "L" shaped bracket 138*a*, 138*b*, with one "L" bracket positioned at each end of the assembly. The "L" brackets 138*a*, 138*b* include mounting holes in one arm of the "L" for attaching the corresponding flange bearing 136*a*, 136*b* using fasteners such as bolts or screws, with slotted openings in the other arm of the "L" for mounting the bracket to a structure.

An anti-rotational disk 140*a*, 140*b* is positioned between each motor 112*a*, 112*b* and the corresponding "L" bracket 138*a*, 138*b* at each end of the assembly. The disks 140*a*, 140*b* operate to space the motors 112*a*, 112*b* away from the "L" brackets 138*a*, 138*b* to provide clearance between the brackets and the rotating outer rotors 114*a*, 114*b*, as well as operating to frictionally couple the stationary internal stator portion of the motors to the corresponding "L" bracket. The anti-rotational disks are preferably made of aluminum.

Each end of the shaft 132 extends through the corresponding flange bearing 136*a*, 136*b* and its supporting "L" bracket 138*a*, 138*b*. With the "L" brackets attached to a structure, it can be seen that shaft 132 supports the load of the entire assembly, distributed through the flange bearings.

Looking to FIG. 6, with the elements of the two-motor integrated direct drive motor system assembled, the operation of the system is similar to that described with respect to the first exemplary embodiment above, except that the drum 118 is directly driven by two motors 112*a*, 112*b* operating in tandem. Thus, the torque and power available to the drum 118 is essentially doubled while the additional space required for the second motor minimally increases the profile of the assembly. Control circuitry operable to operate the motors in unison at a desired speed and direction of rotation, and for monitoring motor and system operational parameters, as well as other system input sensors, such as door curtain position sensors or encoders, is known in the art.

Figure 7:
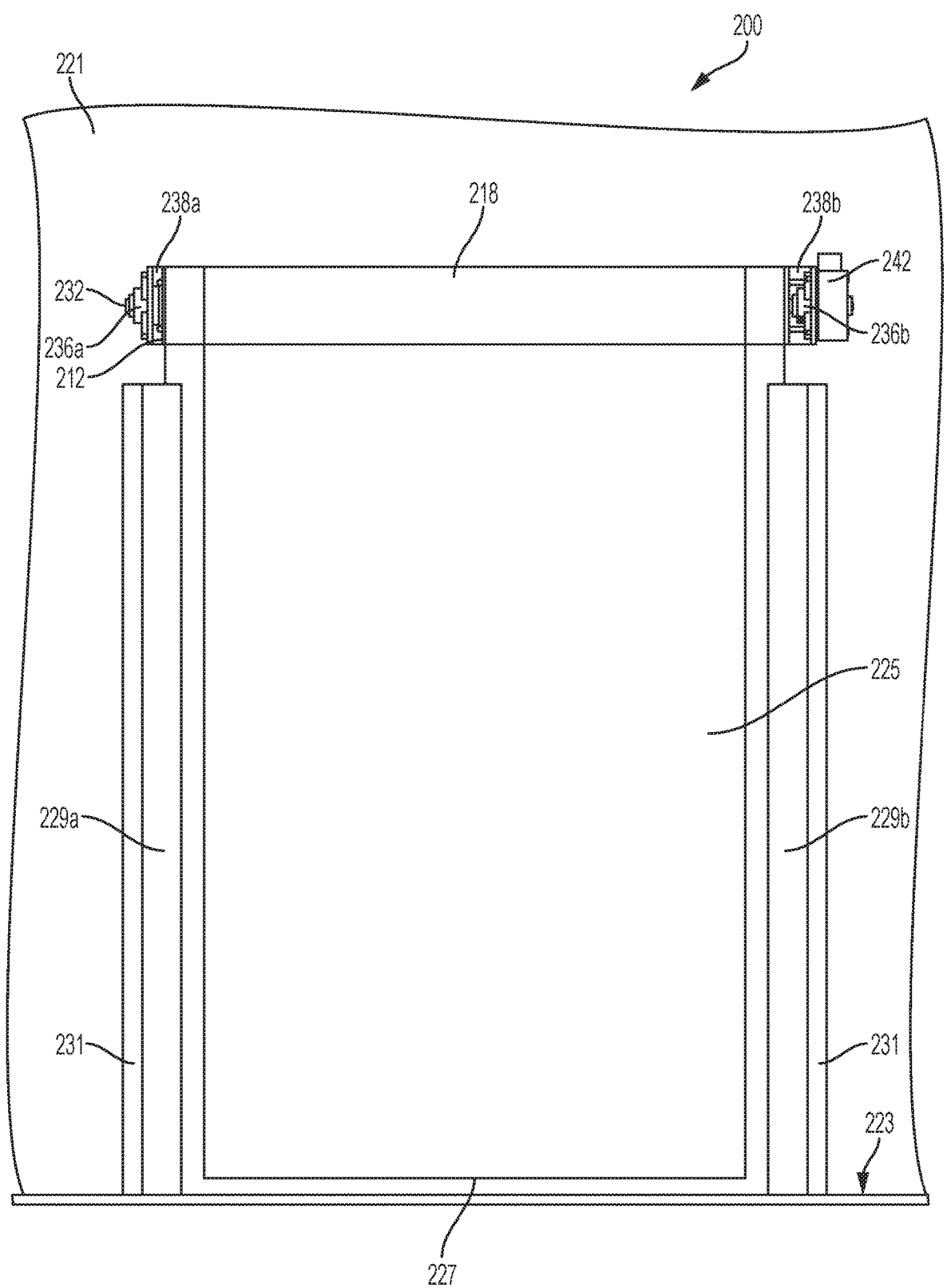
FIG. 7 is a front view of an integrated drive motor assembly used in a high-speed roll-up door application in accordance with an exemplary embodiment of the present invention.

Turning to FIG. 7, a high-speed roll-up door system employing an integrated direct drive motor system in accordance with an exemplary embodiment of the present invention is depicted generally by the numeral 200. The high-speed roll-up door system comprises an integrated direct drive motor system as generally described above with respect to the first exemplary embodiment depicted in FIGS. 1 through 4, including a three-phase outer rotor motor 212 driving a drum 218. The motor and drum assembly is supported by a shaft 232 extending along the interior axis of the assembly, with the outer ends of the shaft 232 supported by flange bearings 236*a*, 236*b* which each attach to a corresponding "L" bracket 238*a*, 238*b*. The "L" brackets 238*a*, 238*b* attach to wall 221 so that the assembly is supported above a doorway opening defined in the wall 221, above floor 223.

A flexible curtain 225 is attached at its upper end to drum 218, with its lower end 227 positioned just above the floor 223 when the curtain is fully extended from the drum 218. Curtain 225 can thus be retracted upwardly, opening the doorway, by operating motor 212 to rotate the drum 218, spooling the curtain onto the drum. Similarly, the curtain can by de-spooled from the drum 218 by operating the motor 212 in the opposite direction so that the curtain extends downwardly to cover the doorway opening. It should be understood that the high-torque direct drive system spools and de-spools the curtain extremely rapidly so that, for example, a sensor in communication with the control circuitry can detect a vehicle (e.g., a forklift) approaching the doorway so that the control circuitry commands the motor to operate to retract the curtain so that the vehicle can pass through, and then commands the motor to operate in the opposite direction to extend the curtain to cover the doorway opening after the vehicle has passed, thus minimizing the time the doorway is open. As previously described, an electromagnetic off brake 242, controlled by the control circuitry, is operable to apply anti-rotational torque to the shaft 232 to prevent the shaft 232 (and thus the drum 218 and motor 212) from rotating, allowing the curtain 225 to be suspended in any desired position above the floor 223.

The lateral edges of the curtain are supported by guide rails 229*a*, 229*b* attached to the face casing 231 surrounding the doorway opening. The guide rails 229*a*, 229*b* prevent the curtain 225 from flapping or bellowing away from the doorway opening during operation and while static.

In further alternative embodiments, the control circuitry driving the motor 212 is configured to recapture energy from the motor(s) when the drum and motor are driven by the weight of the belt unspooling itself from the drum (i.e., when not held by the electromagnetic off brake). For example, in an exemplary embodiment, when curtain 225 is spooled up onto the drum 218 (i.e., the door is open), the weight of the curtain suspended above the floor and the force of gravity create a potential energy of that spooled curtain. If the electromagnetic off brake is disengaged, gravity will cause the curtain to fall—i.e., de-spool—causing the drum 218 and motor 212 to rotate as the curtain unwinds itself. Because motor 212 is a permanent magnet motor, that rotation imparted by the falling curtain generates power in the motor, with the motor essentially acting as a generator driven by the falling curtain. That generated energy is captured by the control circuitry, and is fed back into the power grid and/or stored for further use. Thus, the system of the present invention allows recapture of a substantial amount of the energy used to raise the curtain by recapturing that energy when gravity pulls the curtain back down.

Figure 8:
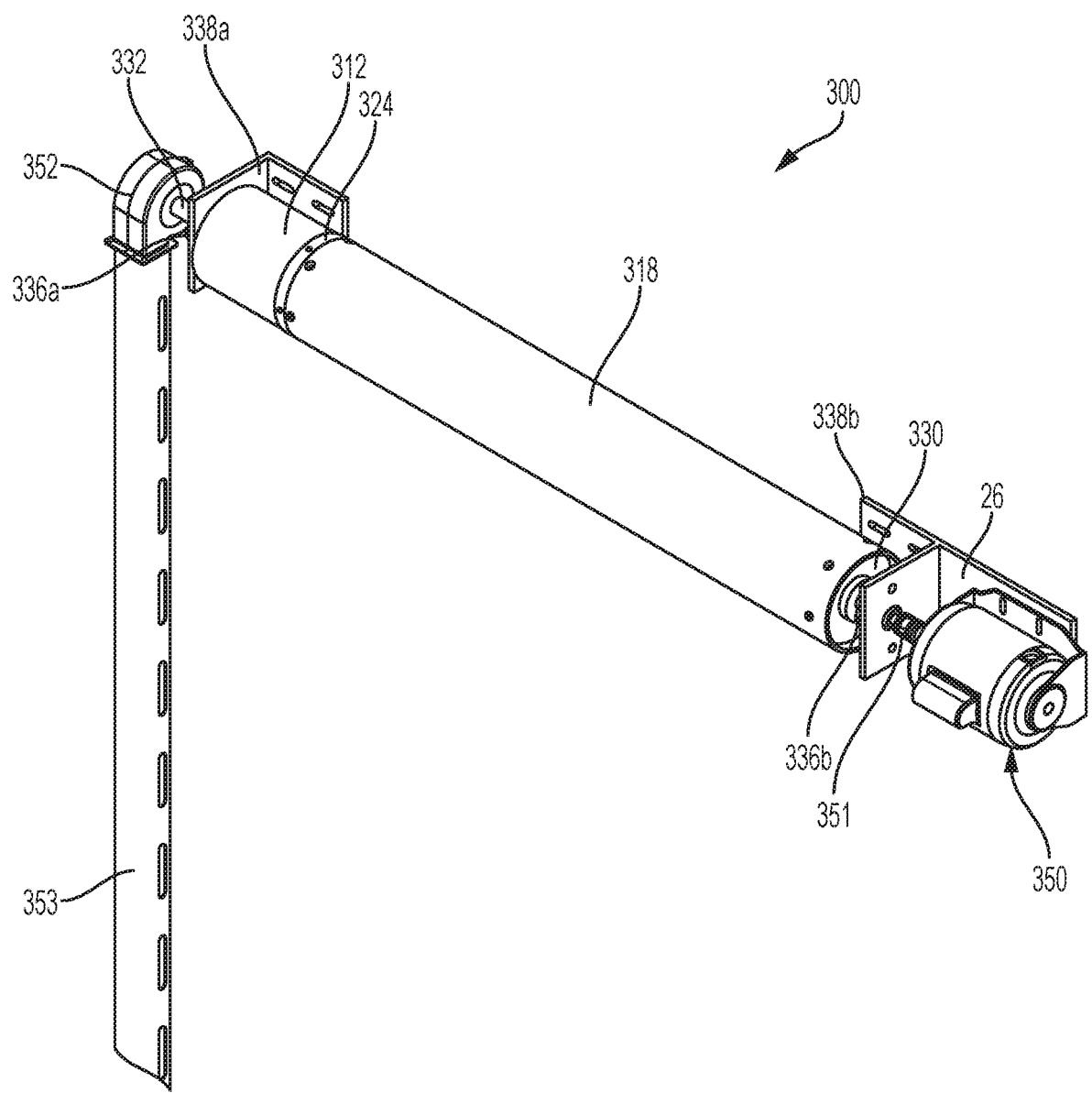
FIG. 8 is a partial perspective view of the high-speed roll-up door of FIG. 7.

Looking to FIG. 8, an alternative configuration of a high-speed roll-up door employing an integrated direct drive motor system and auxiliary blower system in accordance with an exemplary embodiment of the present invention is designated generally by the numeral 300.

As shown in FIG. 8, in a manner similar to that previously described, shaft 332 extends along the center axis of the assembly, through outer rotor motor 312 and drum 318, and is supported by two flange bearings 336a, 336b at opposite ends of the assembly, with each flange bearing attached to a corresponding "L" bracket 338a, 338a which attach to a wall using fasteners to support the integrated drive assembly above a doorway opening. The motor 312 is attached to the drum 318 via adapter coupler 324 and end flange 330 in the manner previously described. In a manner also similar to that described previously, a flexible curtain attaches at one end to drum 318 so that operation and rotation of the motor 312 and drum 318 spool and de-spool the curtain onto and off of the drum to extend and retract the curtain over the door opening. In this configuration, the shaft 332 is not keyed or connected to the adapter coupler 324 or the end flange 330, but passes through the axis of the adapter coupler 324 and end flange 330, preferably through bearings press fit into the corresponding axial passageways in the adapter coupler and end flange so that the shaft 332 does not rotate with the drum 318 or motor 312, but can be operated independently.

A separate blower drive motor 350 is attached to the distal end of shaft 332 via, for example, a Lovejoy® coupler 351, with the blower drive motor preferably mounted to a secondary support bracket attached to, or integral with, the "L" bracket 338b. A blower 352 is attached at the opposite end of the shaft 332, near motor 312, so that operation of the blower drive motor 350 rotates the shaft 332 to operate the blower 352 which preferably directs a stream of air downwardly from the assembly. An air knife 353 conduit attached to the blower 352 and extending down the side of the doorway opening jet-streams or directs hot or cold air from the blower across the curtain to prevent moisture or frost build up on the curtain. Thus, the blower drive motor 350 drives the blower 352 via rotation of shaft 332, independently of the rotation or operation of the motor 312 and drum 318 used to operate the curtain. Shaft 332, however, still supports the weight of the entire assembly, mounted to the wall or other structure via "L" brackets 338a, 338b. Thus, the shaft 332 need not be coupled to the motor 312 and/or drum 318, but can be used for ancillary purposes while supporting the integrated direct drive motor system.

Figure 9:
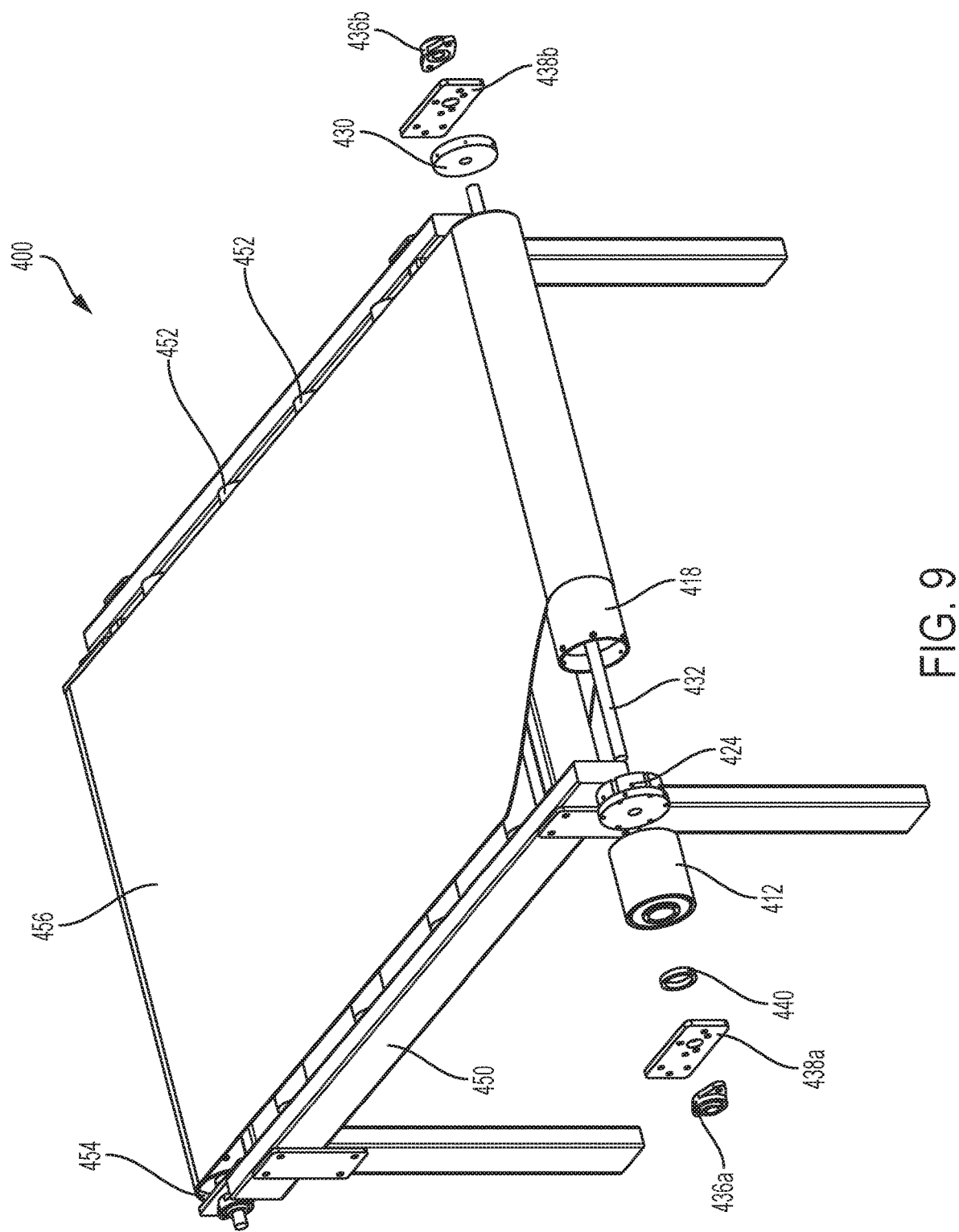
FIG. 9 is a front perspective view of an integrated drive motor assembly used in a conveyor application in accordance with an exemplary embodiment of the present invention.

Looking to FIG. 9, a configuration of a conveyor system employing an integrated direct drive motor system in accordance with an exemplary embodiment of the present invention is depicted generally by the numeral 400. It should be understood that in this conveyor system that the configuration of an outer rotor motor, drum, shaft, etc. are similar to the configurations and embodiments previously described. However, in this configuration the integrated direct drive motor system is attached to a conveyor system and the drum drives a continuous-loop conveyor belt as will now be described.

Looking to FIG. 9, the conveyor system includes a support structure 450 comprising horizontal and vertical struts attached to form a frame. In a manner similar to that previously described, an outer rotor motor 412 attaches to a drum 418 via an adapter coupler 424 and an end flange 430. A shaft 432 extends axially through the motor 412, drum 418, adapter coupler 424, and end flange 430, and into flange bearings 436a, 436b at opposite ends of the assembly. The flange bearings 436a, 436b are attached to corresponding mounting brackets 438a, 438b at each end of the assembly, the mounting brackets 438a, 438b include holes for attaching the brackets to the conveyor support structure 450. An aluminum spacer disk is attached between the motor 412 and the corresponding support bracket 438a. With the integrated motor and drum assembly attached to the conveyor support structure 450, the drum 418 extends horizontally across one end of the structure. An endless-loop flexible conveyor belt 456 extends across the top of the structure, atop a series of rollers 452 extending between the side rails of the structure, down around the drum 418 at one end, back under the rollers 452, and up around an idler drum 454 at the opposite end of the conveyor, completing the loop. With the conveyor belt 456 tensioned between the drum 418 and the idler drum 454, operating the motor rotates the drum, which in turn drives the conveyor belt. As in the high-speed roll-up door configuration previously described and the various embodiments of the motor and drum assembly previously described, the torque and power of the motor is transferred directly to the drum without any intervening transmission or clutch mechanisms.

Figure 10:
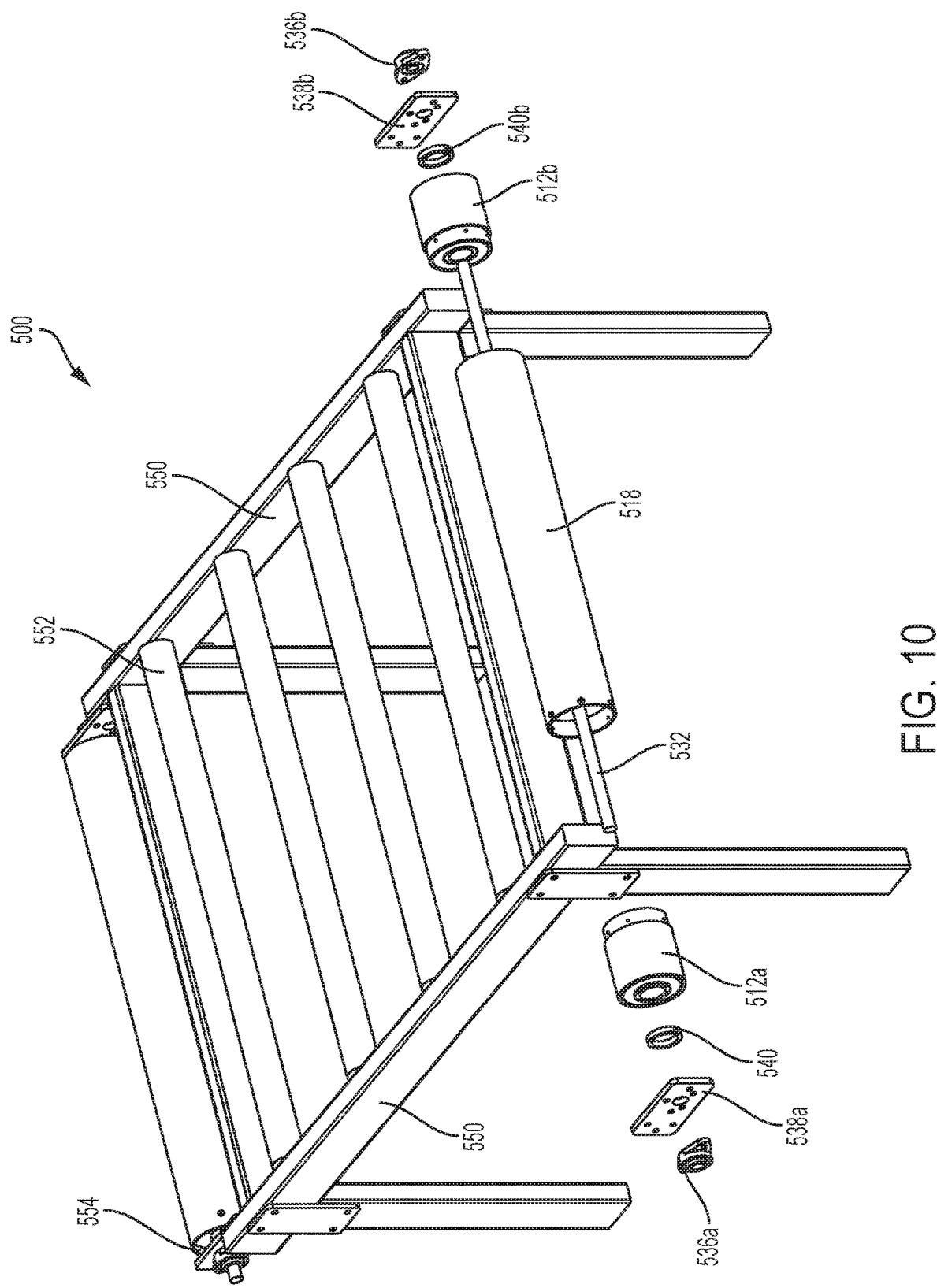
FIG. 10 is a front perspective view of an integrated drive motor assembly used in a conveyor application in accordance with an exemplary embodiment of the present invention.

Looking to FIG. 10, an alternative configuration of a conveyor system employing an integrated direct drive motor system having two motors in accordance with an exemplary embodiment of the present invention is depicted generally by the numeral 500. It should be understood that in this conveyor system that the configuration of an outer rotor motor, drum, shaft, etc. are similar to the configurations and embodiments previously described. However, in this configuration the integrated direct drive motor system employs two motors attached to a conveyor system driving a continuous-loop conveyor belt.

The conveyor system includes a support structure 550 comprising horizontal and vertical struts attached to form a frame. In a manner similar to that previously described, two outer rotor motors 512a, 512b are attached to opposite ends of a drum 518 via adapter couplers 524a, 524b. A shaft 532 extends axially through the motors 512a, 512b, drum 518, and adapter couplers 524a, 524b and into flange bearings 536a, 536b at opposite ends of the assembly. The flange bearings 536a, 536b are attached to corresponding mounting brackets 538a, 538b at each end of the assembly, the mounting brackets 538a, 538b include holes for attaching the brackets to the conveyor support structure 550. An aluminum spacer disk 540a, 540b is attached between each corresponding motor 513a, 512b and the corresponding support bracket 538a, 538b. With the integrated motor and drum assembly attached to the conveyor support structure 550, the drum 518 extends horizontally across one end of the structure. An endless-loop flexible conveyor belt (not shown in this view) extends across the top of the structure, atop a series of rollers 552 extending between the side rails of the structure, down around the drum 518 at one end, back under the rollers 552, and up around an idler drum 554 at the opposite end of the conveyor, completing the loop. With the conveyor belt tensioned between the drum 518 and the idler drum 554, operating the two motors in tandem rotates the drum, which in turn drives the conveyor belt. As in the high-speed roll-up door configuration previously described and the various embodiments of the motor and drum assembly previously described, the torque and power of the two motors are transferred directly to the drum without any intervening transmission or clutch mechanisms.

Figure 11:
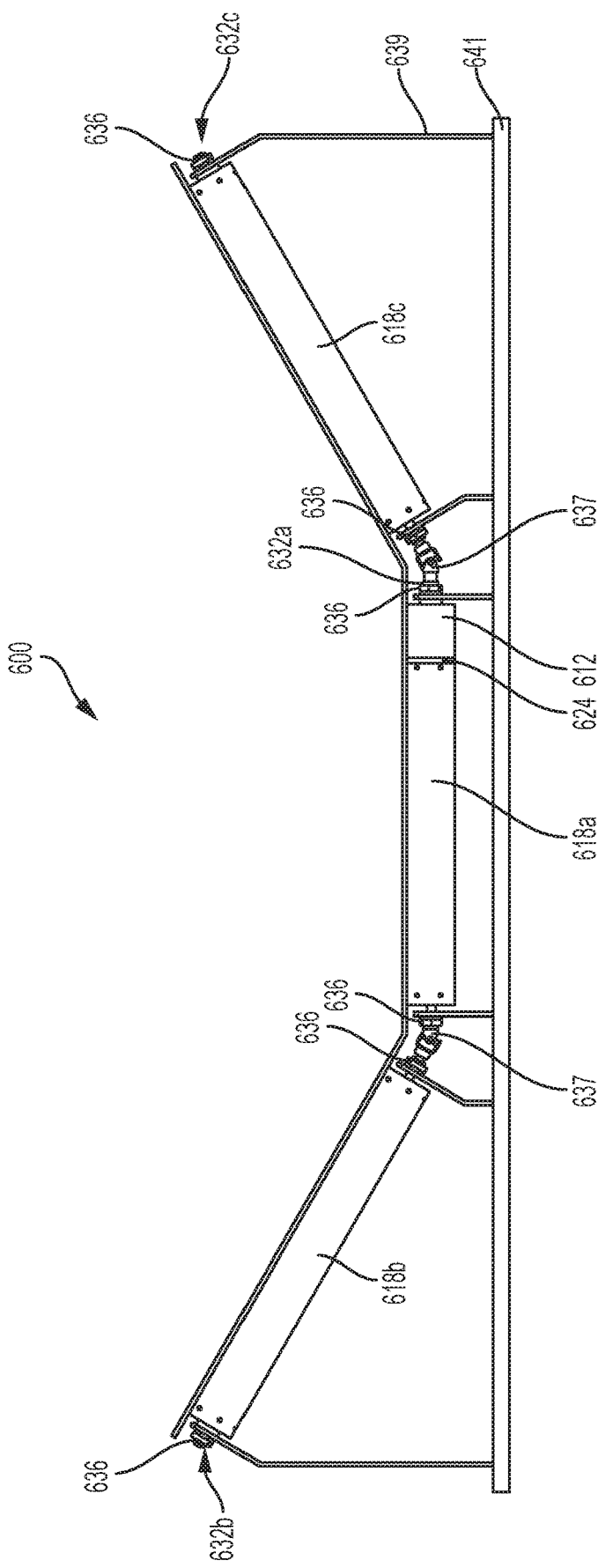
FIG. 11 is an end view of an integrated drive motor assembly used in a multi-drum conveyor system in accordance with an exemplary embodiment of the present invention.

Looking to FIG. 11, an end view of a conveyor assembly having multiple drums driven by a single integrated direct drive motor system in accordance with an exemplary embodiment of the present invention id depicted generally by the numeral 600. The system includes a motor 612 attached to a first drum 618a via an adapter coupler 624 in a manner as previously described, attached to a support structure 639. The shaft 632a of the motor assembly is supported at each end by a flange bearing 636. Couplers 637 attached to each end of the shaft 632a likewise couple to the shafts 632b, 632c of the adjoining drums. With the shaft of each assembly coupled to the adapter coupler or end flange of the corresponding drum, then driving one drum (i.e., the motor 612 and drum 618a of the center assembly shown) in turn drives the attached drums. Thus, in the configuration shown, all three drums 618a, 618b, 618c turn in unison when motor 612 directly drives the first drum. As seen in the figure, the couplers 637 are "U" joint type couplers allowing the adjacent drums to be positioned at various angles to each other.

From the above, it can be seen that the integrated direct drive motor system of the present invention provides a high-torque drive system having minimal parts compared to induction motor systems known in the art. The integrated direct drive motor system of the present invention couples the outer rotor motor to the drum either directly, or via an adapter coupler, with no transmission or clutch assembly between the motor and the drum. Thus, the complexity and required maintenance of the system is reduced compared to known systems, and the reliability and maintainability is increased.

While the system and of the present invention have been described herein with respect to industrial applications such as high-speed roll-up doors and conveyor systems, it should be understood that the integrated drive system of the present invention may similarly be employed in other industrial applications requiring a high-torque rotational output, such as concrete power screeds.

Many different arrangements of the various components depicted, as well as components not shown, are possible without departing from the scope of the claims below. Embodiments of the technology have been described with the intent to be illustrative rather than restrictive. Alternative embodiments will become apparent to readers of this disclosure after and because of reading it. Alternative means of implementing the aforementioned can be completed without departing from the scope of the claims below. Identification of structures as being configured to perform a particular function in this disclosure and in the claims below is intended to be inclusive of structures and arrangements or designs thereof that are within the scope of this disclosure and readily identifiable by one of skill in the art and that can perform the particular function in a similar way. Certain features and sub-combinations are of utility and may be employed without reference to other features and sub-combinations and are contemplated within the scope of the claims.

What is claimed and desired to be secured by Letters Patent is as follows:

1. An integrated direct drive motor system for a high-speed roll-up door, comprising:
    a first motor comprising a stationary inner stator and a rotatable outer rotor and having a rotational axis, the outer rotor having a first axial adapter-facing end;
    an elongated drum extending between first and second ends and having a rotational axis positioned in axial alignment with the first motor, the elongated drum having an outer wall having an inner surface; and
    a first adapter coupler having a rotational axis and a first axial motor-facing end, the first adapter coupler being in axial alignment with the drum and the first motor such that the first adapter coupler rotates identically with the outer rotor and the drum, the first adapter coupler being attached to the the drum near the first end of the drum such that the first adapter coupler abuts the inner surface of the outer wall of the drum, the first adapter coupler being detachably connected to the first motor such that the first axial motor-facing end of the first adapter coupler and the first axial adapter-facing end of the outer rotor of the first motor abut each other, whereby the first adapter coupler is positioned axially between the outer rotor of the first motor and the first end of the drum so that the first motor including the outer rotor is entirely axially spaced from the elongated drum and the elongated drum is entirely axially spaced from the first motor including the outer rotor.

2. The system of claim 1, further comprising an end flange having a rotational axis in axial alignment with the first motor and the drum, the end flange being attached to the second end of the drum such that the end flange rotates identically with the outer rotor, the adapter coupler, and the drum.

3. The system of claim 2, further comprising a shaft having first and second ends extending axially through the stationary inner stator of the first motor, the drum, the adapter coupler, and the end flange such that the weight of the drum and the first motor is borne by the shaft when the shaft is supported at both ends.

4. The system of claim 3, wherein the shaft is attached to at least one of the adapter coupler and the end flange so that the shaft rotates identically with the attached adapter coupler or end flange.

5. The system of claim 3, further comprising first and second brackets coupled to the first and second ends of the shaft, respectively, the first and second brackets configured to attach to a structure to support the weight of the system.

6. The system of claim 5, further comprising first and second flange bearings attached to the first and second brackets, respectively, each of said flange bearings configured to support a corresponding end of the shaft.

7. The system of claim 5, further comprising a spacer disk positioned between the first motor and the first bracket.

8. The system of claim 3, wherein the shaft is rotatably driven by the outer rotor.

9. The system of claim 1, further comprising:
    a second motor having a stationary inner stator, a rotatable outer rotor, and a rotational axis, the second motor positioned in axial alignment with the first motor and with the drum, the outer rotor of the second motor having a first axial adapter-facing end; and a second adapter coupler having a rotational axis and a first axial motor-facing end, the second adapter coupler being in axial alignment with the drum and the second motor such that the second adapter couple rotates identically with the outer rotor of the second motor, the second adapter coupler being attached to the second motor such that the first axial motor-facing of the second adapter coupler and the first axial adapter-facing end of the outer rotor of the second motor abut each other, whereby the second adapter coupler is positioned axially between the outer rotor of the second motor and the second end of the drum so that the second motor including the outer rotor of the second motor is entirely spaced from the elongated drum and the elongated drum is entirely axially spaced from the second motor including the outer rotor of the second motor.

10. The system of claim 9, further comprising a shaft having first and second ends extending axially through the stationary inner stator of the first motor, the drum, and the stationary inner stator of the second motor such that the weight of the drum and first and second motors is borne by the shaft with the shaft supported at both ends.

11. The system of claim 10, further comprising first and second brackets coupled to the first and second ends of the shaft, respectively, the first and second brackets configured to attach to a structure to support the weight of the system.

12. The system of claim 1, wherein the drum and the outer rotor of the first motor can be independently detached from the first adapter coupler.

13. An integrated direct drive motor system for a high-speed roll-up door, comprising:
- a first motor comprising a stationary inner stator and a rotatable outer rotor and having a rotational axis, the outer rotor having a first axial adapter-facing end;
- an elongated drum extending between first and second ends and having a rotational axis positioned in axial alignment with the first motor, the drum including an outer wall having an inner surface;
- a first adapter coupler having a rotational axis and a first axial motor-facing end, the first adapter coupler being in axial alignment with the drum and the first motor such that the first adapter coupler rotates identically with the outer rotor and the drum, the first adapter coupler being attached to the drum near the first end of the drum such that the first adapter coupler abuts the inner surface of the outer wall of the drum, the first adapter coupler being detachably connected to the first motor such that the first axial motor-facing end of the first adapter coupler and the first axial adapter-facing end of the outer rotor of the first motor abut each other, whereby the first adapter coupler is positioned axially between the outer rotor of the first motor and the first end of the drum so that the first motor including the outer rotor is entirely axially spaced from the elongated drum and the elongated drum is entirely axially spaced from the first motor including the outer rotor; and
- a flexible curtain configured to cover a doorway opening and extending between upper and lower ends, the upper end of the curtain being attached to the drum such that operating the first motor in a first direction spools the curtain onto the drum to uncover the doorway opening and operating the first motor in a second direction unspools the curtain from the drum to cover the doorway opening.

14. The system of claim 13, further comprising a shaft having first and second ends extending axially through the stationary inner stator of the first motor, the drum, the adapter coupler, and the end flange such that the weight of the drum and the first motor is borne by the shaft when the shaft is supported at both ends, and wherein the shaft is coupled to the adapter coupler such that the shaft rotates identically with the adapter coupler.

15. The system of claim 14, further comprising an electromagnetic brake surrounding a portion of the shaft and operable to stop rotation of the shaft upon application of a control current so that rotation of the drum is prohibited to retain the curtain in a desired position between fully extended and fully retracted.

16. The system of claim 15, further comprising at least one bracket coupled to the first and second ends of the shaft, the bracket configured to attach the integrated motor system to a structural element above the doorway opening.

17. An integrated direct drive motor system for a high-speed roll-up door, comprising:
- a first motor comprising a stationary inner stator and a rotatable outer rotor and having a rotational axis, the outer rotor having a first axial adapter-facing end;
- an elongated drum extending between first and second ends and having a rotational axis positioned in axial alignment with the first motor, the drum including an outer wall having an inner surface;
- a first adapter coupler having a rotational axis and a first axial motor-facing end, the first adapter coupler being in axial alignment with the drum and the first motor such that the first adapter coupler rotates identically with the outer rotor and the drum, the first adapter coupler being attached to the drum near the first end of the drum such that the first adapter coupler abuts the inner surface of the outer wall of the drum, the first adapter coupler being detachably connected to the first motor such that the first axial motor-facing end of the first adapter coupler and the first axial adapter-facing end of the outer rotor of the first motor abut each other, whereby the first adapter coupler is positioned axially between the outer rotor of the first motor and the first end of the drum so that the first motor including the outer rotor is entirely axially spaced from the elongated drum and the elongated drum is entirely axially spaced from the first motor including the outer rotor, the first axial motor-facing end of the first adapter coupler having an outer diameter equal to an outer diameter of the first axial adapter-facing end of the outer rotor, the first adapter coupler including a protruding end being configured to be inserted into the first end of the drum; and
- a flexible curtain configured to cover a doorway opening and extending between upper and lower ends, the upper end of the curtain being attached to the drum such that operating the first motor in a first direction spools the curtain onto the drum to uncover the doorway opening and operating the first motor in a second direction unspools the curtain from the drum to cover the doorway opening.

\* \* \* \* \*